US010715260B1

(12) United States Patent
Esman et al.

(10) Patent No.: US 10,715,260 B1
(45) Date of Patent: Jul. 14, 2020

(54) PHOTONIC MONOPULSE COMPARATOR

(71) Applicant: Rockwell Collins, Inc., Cedar Rapids, IA (US)

(72) Inventors: Ronald D. Esman, McLean, VA (US); Wenlu Chen, Clarksville, MD (US); Oliver S. King, Frederick, MD (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/265,659

(22) Filed: Feb. 1, 2019

(51) Int. Cl.
*H04B 10/70* (2013.01)
*H04J 14/02* (2006.01)
*H04B 10/548* (2013.01)
*G02B 6/293* (2006.01)
*G02B 6/42* (2006.01)
*H04B 10/69* (2013.01)

(52) U.S. Cl.
CPC .......... *H04B 10/70* (2013.01); *G02B 6/2938* (2013.01); *G02B 6/42* (2013.01); *G02B 6/4215* (2013.01); *H04B 10/548* (2013.01); *H04B 10/6911* (2013.01); *H04J 14/02* (2013.01)

(58) Field of Classification Search
None
See application file for complete search history.

(56) References Cited

U.S. PATENT DOCUMENTS 5,365,239 A * 11/1994 Stilwell, Jr. .......... H01Q 3/2676
342/368
5,977,911 A * 11/1999 Green ...................... H01Q 3/22
342/157
9,882,654 B1 * 1/2018 Yap ........................ H04B 10/00

OTHER PUBLICATIONS

Rao, Ashutosh, "Thin-film Lithium Niobate Photonics for Electro-optics, Nonlinear Optics, and Quantum Optics on Silicon", Doctoral Dissertation, University of Central Florida STARS, Jun. 11, 2018, 264 pages.
Sherman, Samuel M. et al., Monopulse Principles and Techniques Second Edition, Jul. 31, 2011.
Wang, Cheng et al., "Nanophotonic lithium niobate electro-optic modulators", Dec. 30, 2016, 6 pages.

* cited by examiner

*Primary Examiner* — David W Lambert
(74) *Attorney, Agent, or Firm* — Suiter Swantz pc llo

(57) ABSTRACT

An integrated photonics monopulse comparator includes an array of squinted monopulse elements, each monopulse element producing an RF signal in response to a received inbound signal and each RF signal having a squinted RF voltage. The comparator includes a laser source for producing a wavelength division multiplexed (WDM) optical signal comprising multiple components having discrete wavelengths. The component signals may be multiplexed and demultiplexed and routed through cascading optical phase modulators, each phase modulator connected to a monopulse element and capable of modulating a component signal according to the voltages of the RF signals produced by the corresponding monopulse element. The resulting modulated component optical signals undergo coherent photodetection by arrays of paired photodiodes, each pair receiving component signals of like wavelength. The output signals of each array are proportional in voltage to sums and differences from which arrival angles of the inbound signal may be calculated.

19 Claims, 6 Drawing Sheets

$V_{out1} \propto [V_1(t) + V_2(t)]$ $V_{out2} \propto [V_1(t) - V_2(t)]$

PHOTONIC MONOPULSE COMPARATOR

BACKGROUND

Monopulse radar, also known as simultaneous lobe comparison, provides the direction of arriving radiation (e.g., radio frequency (RF) or other electromagnetic signals) by comparing the signals produced by monopulse elements in slightly different directions ("squinted" subarrays or signals). Monopulse radar may be useful for determining angle of arrival in one or more dimensions, but electronic or fiber optic components may provide challenges with respect to their performance, loss, or relative size.

SUMMARY

In one aspect, embodiments of the inventive concepts disclosed herein are directed to a photonic monopulse comparator for determining an angle of arrival (e.g., azimuthal angle, elevational angle) of an inbound signal. The photonic monopulse comparator includes an array of squinted monopulse elements (e.g., a one-dimensional array of two elements, a two-dimensional array of four elements). Each monopulse element includes an antenna element for receiving the inbound signal; the squinted elements will each receive the inbound signal at a squinted, or slightly different, angle or direction. Each monopulse element includes receiver circuitry capable of producing an RF signal in response to the receiving of the inbound signal, each generated signal having a squinted RF voltage. The photonic monopulse comparator includes a continuous-wave or pulsed laser or like photonic source capable of generating an optical signal. The optical signal may be routed through integrated waveguides or optical fibers and through one or more cascading optical phase modulators, each optical phase modulator connected to a monopulse element and capable of modulating the optical signal according to the RF signal received therefrom. The photonic monopulse comparator includes an array of optical hybrid couplers capable of receiving the modulated optical signals and generating balanced outputs, e.g., 2×2 hybrid couplers capable of receiving an in-phase modulated optical signal and a quadrature modulated optical signal. The modulated optical output of the hybrid couplers is fed to an array of balanced photodiode pairs, each pair of photodiodes capable of detecting a hybrid output signal and generating an RF output signal corresponding to the output signal and having an output voltage. Each RF output may be digitized by analog-digital converters (ADC), the resulting digital output signal having a voltage proportional to either a sum or a difference (e.g., azimuthal or elevational) from which the angle of arrival can be calculated.

In a further aspect, embodiments of the inventive concepts disclosed herein are directed to an integrated photonics monopulse comparator. The integrated photonics monopulse comparator includes an array of squinted monopulse elements (e.g., a one-dimensional array of two elements, a two-dimensional array of four elements). Each monopulse element includes an antenna element for receiving the inbound signal; the antenna elements will each receive the inbound signal at a squinted, or slightly different, angle or direction. Each monopulse element includes receiver circuitry capable of producing an RF signal in response to the receiving of the inbound signal, each generated signal having a squinted RF voltage. The photonic monopulse comparator includes a continuous-wave or pulsed laser or like photonic source capable of generating an optical signal, e.g., a wavelength division multiplexed (WDM) optical signal comprising component optical signals, each component optical signal having a discrete wavelength. The WDM optical signal is fed through a linear array of wavelength demultiplexers (capable of splitting the WDM optical signal into its component signals) and multiplexers (capable of combining the component signals into the WDM optical signal). The linear array of multiplexers and demultiplexers is interspersed with cascaded optical phase modulators, each optical phase modulator connected to a monopulse element and capable of modulating one or more component optical signals according to the RF voltage of the input signal produced by the corresponding monopulse element. The optical phase modulators may be cascaded in that, for example, a component optical signal passing through a first and then a second phase modulator will be modulated according to both signals, or to the sum or difference of their corresponding voltages. The integrated photonics monopulse comparator includes an array of paired photodiodes at the end of the linear array opposite the laser signal source. Each pair of photodiodes receives two component optical signals of shared wavelength, the RF output signal generated therefrom having an output voltage based on the sum or difference of the modulated voltages of the component optical signals and proportional to a sum or difference of the squinted signals produced by the monopulse elements (e.g., a sum, azimuthal difference, or elevational difference), from which an angle of arrival (e.g., azimuthal angle, elevational angle) may be calculated.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1:
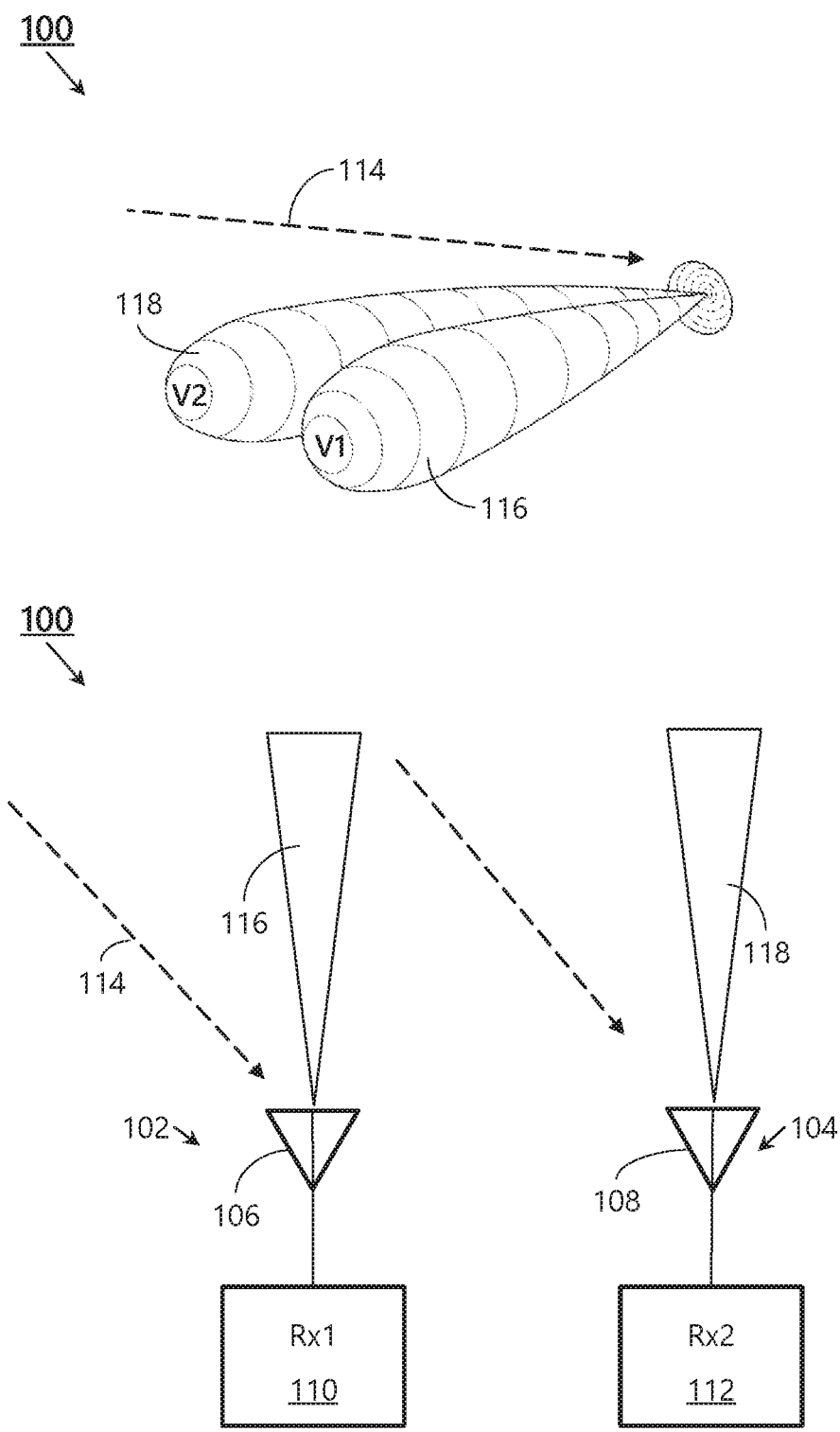
FIG. 1 is a combination view of an embodiment of a one-dimensional squinted monopulse array.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a photonic monopulse comparator for determining the angle and direction of an arriving inbound RF signal in the optical domain. Optical signals are modulated by the RF input signals generated by the squinted monopulse subarrays (e.g., elements) to determine angle of arrival in one or more angular dimensions, at high speed and across an ultrawide bandwidth.

Referring to FIG. 1, a one-dimensional (1D) monopulse array 100 (e.g., aperture) may include subarrays 102 and 104, each subarray including antenna elements 106 and 108 and receiver elements 110 and 112. For example, the two subarrays 102 and 104 may receive an inbound signal 114 via their respective antenna element(s) 106 and 108 from squinted, or slightly different, directions. The respective receiver elements 110, 112 each produce a radio frequency (RF) signal (e.g., associated with the squinted beam) V1 (116) and V2 (118). In some embodiments, the monopulse array 100 may include a phased array, steerable array, or steerable subarrays. A subarray may consist of a single element or many elements configured to produce a single output.

Figure 2:
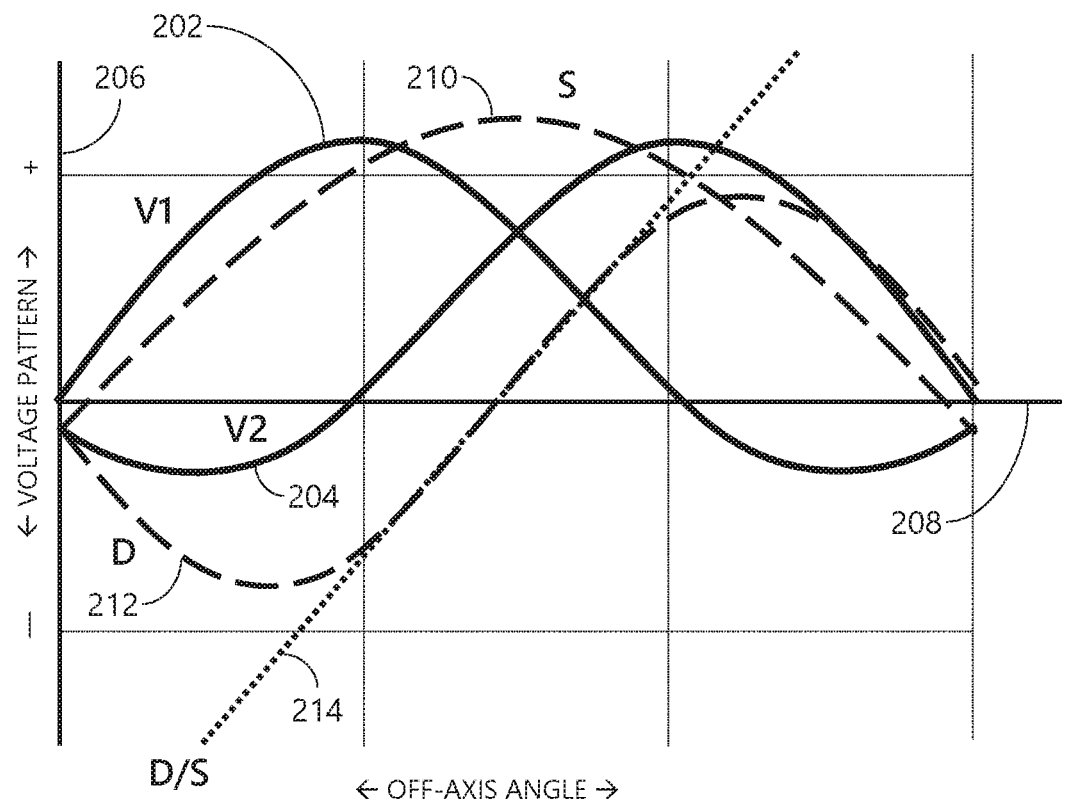
FIG. 2 is a graphic illustration of an off-axis angle and its components of the squinted monopulse arrays of FIG. 1.

Referring now to FIG. 2, the squinted beams V1, V2 (116, 118; FIG. 1) may be associated with RF voltage patterns 202 and 204 (per the vertical axis 206) relative to the off-axis angle (e.g., the angle of arrival of the inbound signal 114 of FIG. 1) (per the horizontal axis 208). From the squinted beams V1 and V2 (116, 118), related signals may be calculated, e.g., a "sum" S (210) and "difference" D (212) such that $$S = \frac{V1 + V2}{\sqrt{2}}; D = \frac{V1 - V2}{\sqrt{2}}$$

where the angle of arrival of the inbound signal 114 is approximately proportional to D/S (214).

Figure 3:
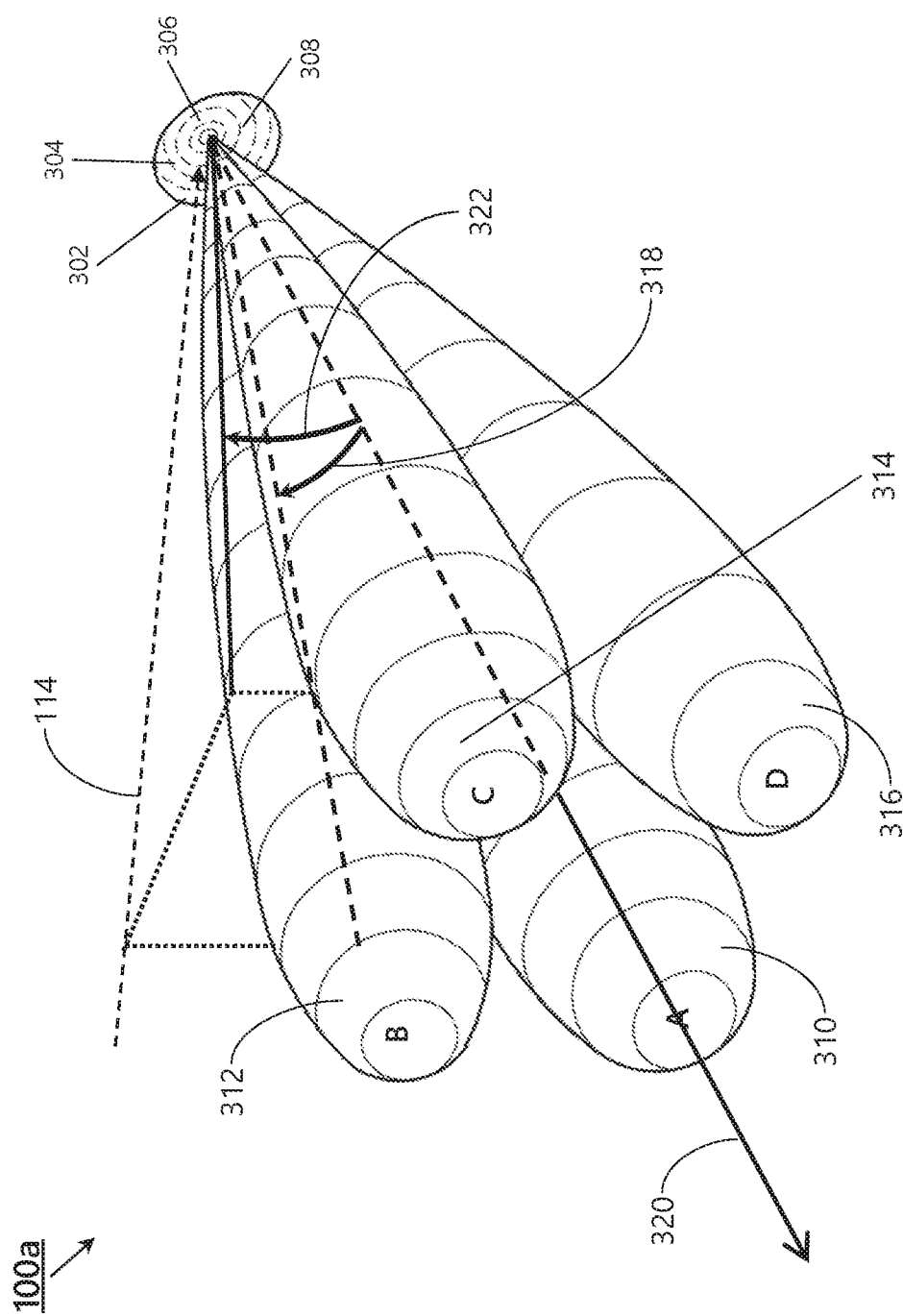
FIG. 3 is an isometric view of an embodiment of a two-dimensional squinted monopulse array.

Referring to FIG. 3, the 2D monopulse array 100a may be implemented and may function similarly to the 1D monopulse array 100 of FIG. 1 except that the 2D monopulse array 200 may incorporate four subarrays 302, 304, 306, 308 which receive four squinted beams A, B, C, D (310, 312, 314, 316). For example, the 2D monopulse array 100a may be an amplitude-comparison monopulse array configured to determine the direction from which the inbound signal 114 originates by determining an azimuthal angle 318 (e.g., relative to broadside 320) and an elevational angle 322 (e.g., relative to the broadside). With respect to the 2D monopulse array 100a, the azimuthal angle 318 and elevational angle 322 are proportional to the ratios $D_{EL}/S$ and $D_{AZ}/S$, respectively, where the sum S is:

$$S = \frac{(A+B)+(C+D)}{2}$$

the elevational difference $D_{EL}$ is:

$$D_{EL} = \frac{(A+C)-(B+D)}{2}$$

and the azimuthal difference $D_{AZ}$ is:

$$D_{AZ} = \frac{(C+D)-(A+B)}{2}$$

relative to the squinted beams A, B, C, D (310, 312, 314, 316).

Figure 4:
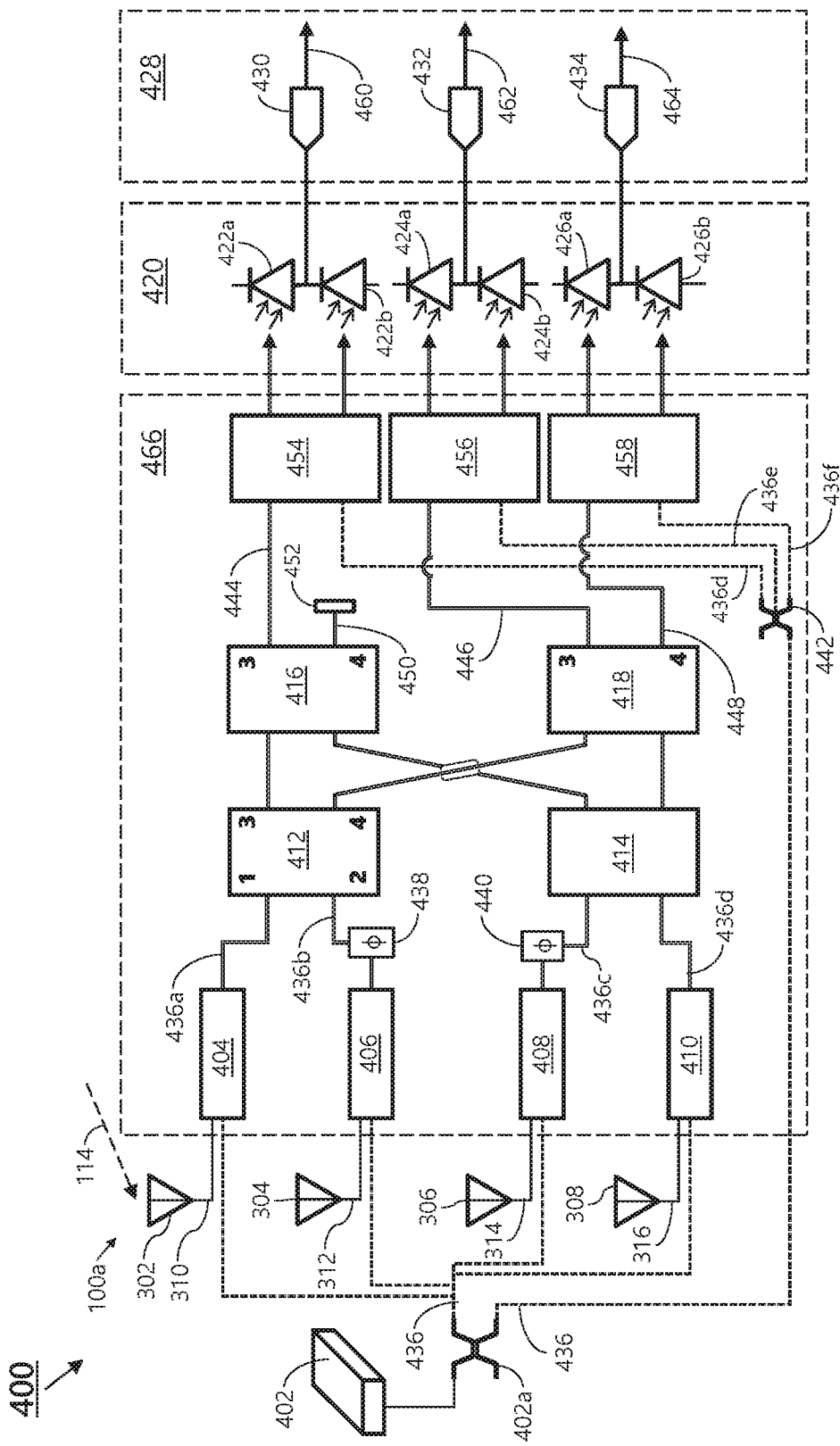
FIG. 4 is a diagrammatic illustration of a photonic monopulse comparator incorporating the squinted monopulse array of FIG. 3.

Referring to FIG. 4, a photonic monopulse comparator 400 may incorporate a photonic signal source (PSS) 402; optical phase modulators 404, 406, 408, 410; hybrid couplers 412, 414, 416, 418; an array 420 of balanced photodiode pairs 422a-b, 424a-b, 426a-b (e.g., photodiode array); and an array 428 of analog-digital converters 430, 432, 434 (ADC).

The PSS 402 may be either a continuous-wave (CW) or pulsed laser; the former implementation may reduce complexity while the latter may provide low-jitter optical sampling and a higher signal/noise ratio (SNR) during the sampling pulse while remaining under the maximum average photocurrent. The PSS 402 may generate an optical signal 436 (e.g., CW or pulsed laser beam) which may be split (402a) and fed to the optical phase modulators 404, 406, 408, 410. Optical signal routing may use optical fibers, integrated optical waveguides, or combinations thereof.

The subarrays 302, 304, 306, 308 of the 2D monopulse array (100a, FIG. 3) may respectively feed RF signals corresponding to their respective squinted beams A, B, C, and D (310, 312, 314, 316) to optical phase modulators 404, 406, 408, and 410 and may modulate the optical signal 436 by the respective RF signals. The modulated optical signals 436a-d may be fed to the hybrid couplers 412, 414, 416, 418; the modulated optical signals 436b-c may first pass through optical phase shifters 438, 440 respectively shifting the phases of the optical signals 90° and −90°.

The hybrid couplers 412, 414, 416, 418 may preferably include 90-degree integrated optical hybrid couplers, e.g., 2×2 devices capable of providing outputs for in-phase and quadrature signals (e.g., the in-phase modulated optical signals 436a, 436d and the quadrature modulated optical signals 436b, 436c, respectively). However, the hybrid couplers 412, 414, 416, 418 may include fiber-optic hybrids depending upon size, weight, loss, and wideband performance considerations (e.g., amplitude or phase balance across a broad bandwidth). The array of hybrid couplers 412, 414, 416, 418 may be a 2×2 array of 2×2 couplers, each coupler having input ports 1, 2 and output ports 3, 4 such that, according to transfer functions:

$$Output_3 = \frac{Input_1 + j(Input_2)}{\sqrt{2}}$$

$$Output_4 = \frac{j(Input_1) + Input_2}{\sqrt{2}}$$

where the phase-modulated optical signals from squinted beams A, B, C, D (310, 312, 314, 316) are treated as complex quantities. The outputs of the hybrid couplers 412, 414 may be fed to the input ports of the hybrid couplers 416, 418, e.g., such that the latter pair of hybrid couplers also provide outputs for in-phase and quadrature modulated optical signals.

The optical signal 436 may further be split (by optical splitter 442) into local oscillator (LO) signals 436d-f. For example, the hybrid couplers 416, 418 may output the hybrid output signals 444 ($Output_3$ of the hybrid coupler 416) and 446, 448 ($Output_3$ and $Output_4$ respectively of the hybrid coupler 418); the hybrid $Output_4$ 450 of the hybrid coupler 416, corresponding to a diagonal difference, may remain unused and terminate in a dummy load 452. The hybrid output signals 444, 446, 448 may respectively be fed into optical 90-degree couplers 454, 456, 458 (e.g., terminal hybrid couplers positioned at the terminal end of the array of hybrid couplers 412-418) along with the LO signals 436d-f (e.g., so that the phase of the hybrid output signals may be measured). The resulting outputs may each be fed into balanced photodiodes 422a-b, 424a-b, 426a-b for coherent photodetection and then digitized by the ADCs 430, 432, 434. The resulting digital output signals 460, 462, 464 may respectively correspond to the elevational difference $D_{EL}$, the sum S, and the azimuthal difference $D_{AZ}$; from these digital output signals the azimuthal angle (318, FIG. 3) and elevational angle (322, FIG. 3) of the inbound signal (114, FIG. 3) may be calculated.

As noted above, the architecture of the photonic monopulse comparator 400 may provide improved amplitude and phase balance across an ultrawide bandwidth (e.g., 40–100 GHz), high linearity (e.g., 70 dB spurious free dynamic range (SFDR) or better) via the optical phase modulators, as well as passive hybrid processing—all in a very small size. As most calculations are performed in the optical domain, electronic calculations, latency, and power consumption are minimized compared to digital signal processors.

The optical-domain components of the photonic monopulse comparator 400, e.g., the optical splitter, optical phase modulators 404, 406, 408, 410, and optical hybrid couplers 412, 414, 416, 418, may be situated in a photonic integrated circuit (PIC) 466 incorporating lithium niobite ($LiNbO_3$) or any appropriate materials from which the PIC may be fashioned. For example, the PIC 466 may be a bulk $LiNbO_3$ chip or thin-film $LiNbO_3$ incorporating monolithically integrated couplers, low-loss waveguides, or thermal-optic phase shifters. Alternatively, the PIC 466 may incorporate $LiNbO_3$ modulators feeding optical signals to a glass-on-silicon chip.

Some of the advantages of photonics-based as opposed to RF-based monopulse comparator systems have been noted above: broad bandwidth, high linearity, immunity to RF interference. RF splitting and combining may be eliminated, and with it the associated dependency on bandwidth and frequency. Wavelength-division multiplexing (WDM) technology may provide additional dimensions of freedom for RF/photonics-based monopulse systems by enabling linear additional and subtraction of RF signals in the optical domain.

Figure 5A:
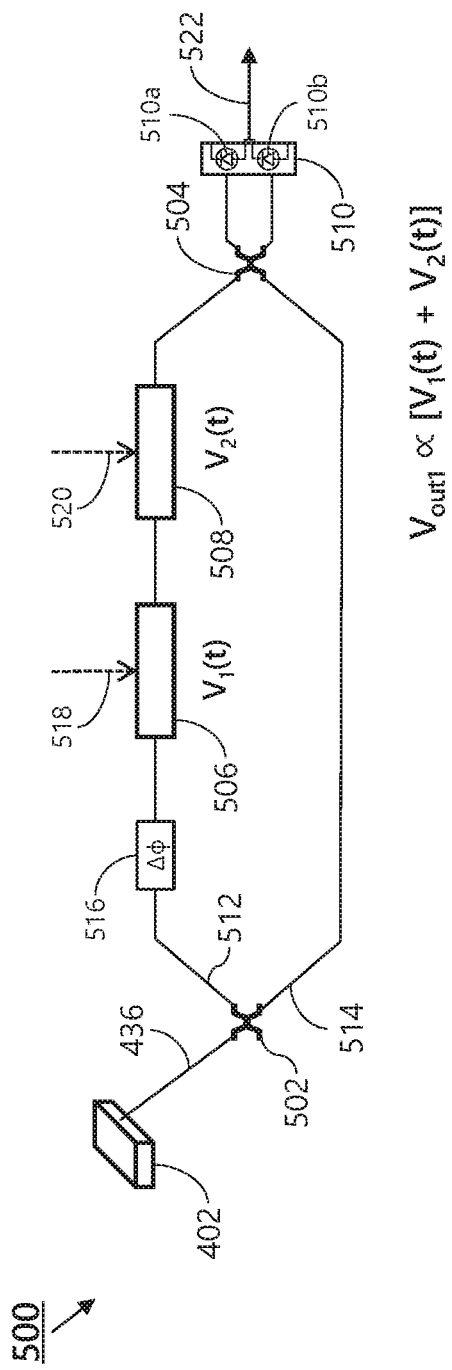
FIGS. 5A and 5B illustrate cascading photonics operations according to the inventive concepts disclosed herein.

Referring to FIG. 5A, the photonic circuit 500 may incorporate a PSS 402, optical splitters/combiners 502, 504, cascading optical phase modulators 506, 508, and balanced photodiode pair 510. Similarly to a Mach-Zehnder interferometer (MZI), the photonic circuit splits (502) the optical signal 436 into a first, or "upper" arm 512 (e.g., optical path), and a second, or "lower" arm 514. The upper arm 512 (e.g., the component optical signal thereof) may undergo phase biasing (via low-speed phase shifter 516) and optical phase modulation: first by the optical phase modulator 506 being driven by the RF input signal 518 (having RF voltage $V_1(t)$) and subsequently by the optical phase modulator 508 driven by the RF input signal 520 (having RF voltage $V_2(t)$). The component optical signals of the upper and lower arms 512, 514 may then undergo coherent photodetection by the balanced photodiode pair 510. The RF output voltage 522 ($V_{out1}$) of the balanced photodiode pair 510 (e.g., the balanced output of the upper and lower photodiodes 510a-b) may be proportional to the sum $[V_1(t)+V_2(t)]$ of the input RF voltages $V_1(t)$, $V_2(t)$ of the RF input signals 518, 520; the component optical signal of the lower arm 514 is unmodulated, while the upper arm 512 is modulated by the cascaded optical phase modulators 506, 508.

Figure 5B:
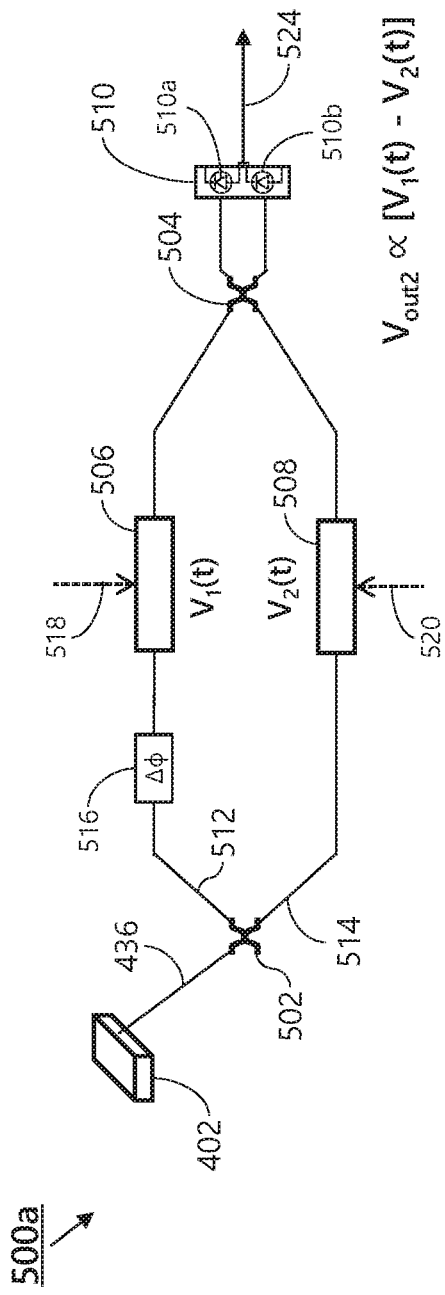

Referring now to FIG. 5B, the photonic circuit 500a may be implemented and may function similarly to the photonic circuit 500 of FIG. 5A, except that the photonic circuit 500a may incorporate the optical phase modulator 508 in the lower arm 514. For example, the component optical signal of the upper arm 512 may be modulated only by the optical phase modulator 506 (and its corresponding RF input signal 518 having RF voltage $V_1(t)$), while the component optical signal of the lower arm 514 may be modulated by the optical phase modulator 508 (and its corresponding RF input signal 520 having RF voltage $V_2(t)$. Accordingly, the RF output voltage 524 ($V_{out2}$) of the balanced photodiode pair 510 may be proportional to the difference [$V_1(t)-V_2(t)$] of the input RF voltages $V_1(t)$, $V_2(t)$ of the RF input signals 518, 520.

Figure 6:
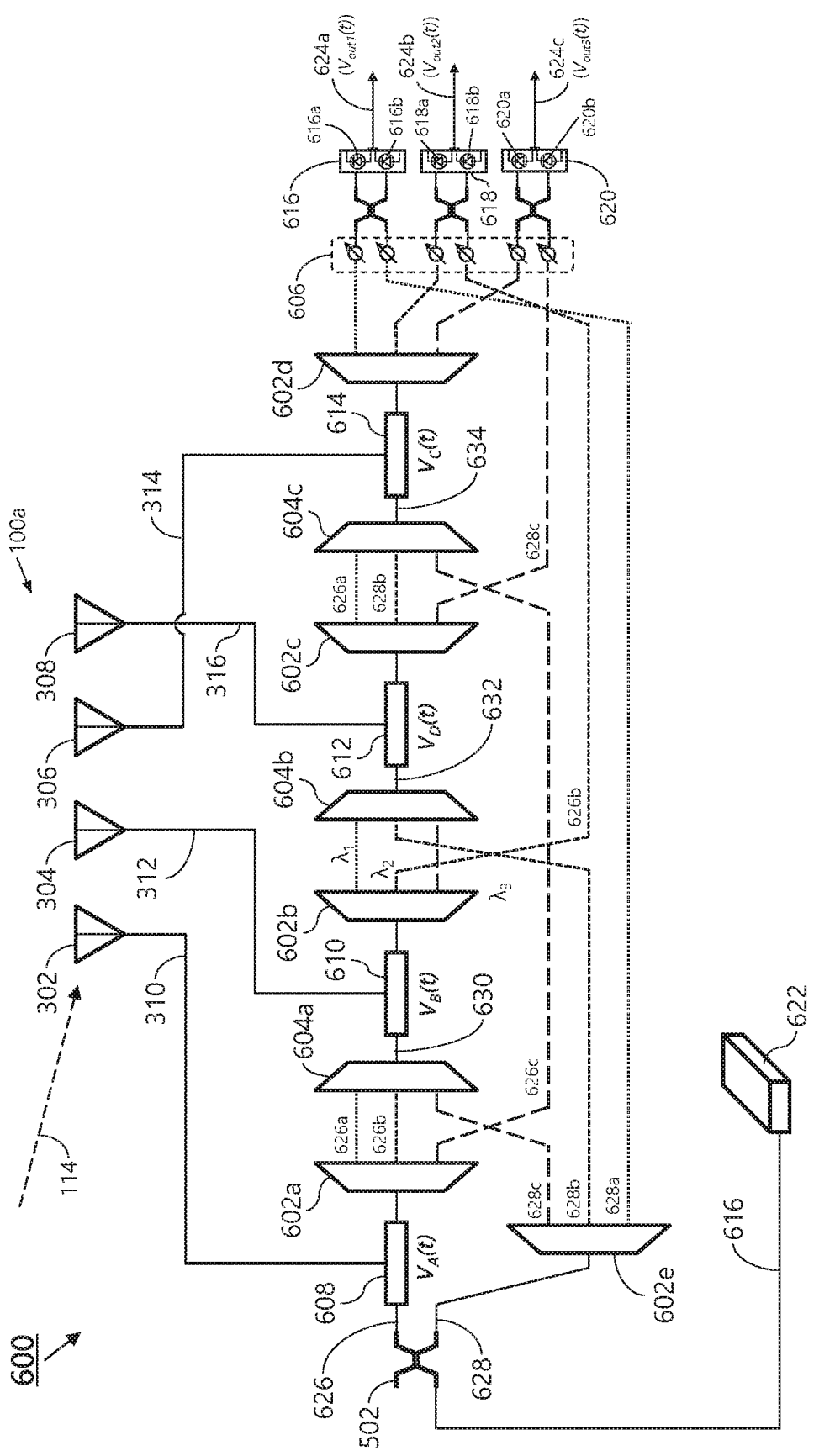
FIG. 6 is a diagrammatic illustration of an integrated photonics monopulse comparator according to the inventive concepts disclosed herein.

Referring to FIG. 6, the integrated photonics monopulse comparator 600 may incorporate a monopulse array 100a (including subarrays 302, 304, 306, 308), splitter/combiner 502, wavelength demultiplexers 602a-d (demuxes), wavelength multiplexers 604a-c (muxes), optical phase shifters 606, cascading optical phase modulators 608, 610, 612, 614, and balanced photodiode pairs 616, 618, 620 (which may be implemented and may function similarly to the balanced photodiode pair 510 of FIGS. 5A/B).

The PSS 622 may generate a wavelength division multiplexed (WDM) signal 616 incorporating any number of component optical signals having discrete wavelengths, e.g., $\lambda_1, \lambda_2, \lambda_3$. The WDM optical signal 616 can incorporate two, three, or any other number of component optical signals as needed.

The integrated photonics monopulse comparator 600 may incorporate the cascaded additive and subtractive properties of the optical component cascade (based on the arrangement of the individual optical phase modulators 608, 610, 612, 614) to determine RF output voltages 624a-c (via the balanced photodiode pairs 616, 618, 620; e.g., the RF output voltage 624a ($V_{out1}(t)$) may correspond to the balanced output of the upper and lower photodiodes 616a, 616b) respectively proportional to the sum S, azimuthal difference $D_{AZ}$, and elevational difference $D_{EL}$. From the RF output voltages 624a-c, then, it is possible to calculate the azimuthal and elevational angles of the inbound signal 114 received by the monopulse subarrays 302, 304, 306, 308 of the monopulse array 100a.

For example, the WDM optical signal 616 may be split (502) into an upper arm 626 and a lower arm 628. The lower arm 628 is demuxed (602e) into component optical signals 628a, 628b, 628c. The upper arm 626 is first modulated by the optical phase modulator 608 (according to the RF voltage $V_A(t)$ of the RF input signal A (310) produced by the monopulse subarray 302 in response to the inbound signal 114) before demuxing (602a) into its component optical signals 626a, 626b, 626c. All three component signals 626a, 626b, 626c of the upper arm 626 are modulated by the RF voltage $V_A(t)$ associated with the optical phase modulator 608.

The component optical signal 628c may be fed into the upper arm 626 of the integrated photonics monopulse comparator 600, replacing the component optical signal 626c which is fed into the lower arm 628 (along with component optical signals 628a, 628b). The upper-arm component optical signals 626a, 626b, 628c are then muxed (604a) into an upper-arm WDM optical signal (630) which is modulated by the optical phase modulator 610 (according to the RF voltage $V_B(t)$ of the RF input signal B (312) produced by the monopulse subarray 304) and demuxed (602b) into the component optical signals 626a, 626b, 628c. At this point the component optical signals 626a, 626b have been modulated by both cascaded optical phase modulators 608, 610 ($V_A(t)+V_B(t)$) while the component optical signal 628c has been modulated solely by the optical phase modulator 610 ($V_B(t)$). The component optical signal 626c has been modulated solely by the optical phase modulator 608 ($V_A(t)$), and not by the optical phase modulator 610 ($V_B(t)$).

The component optical signal 626b may then be fed into the lower arm 628 (along with component optical signals 626c, 628a) and replaced in the upper arm 626 by the as yet unmodulated component optical signal 628b. The resulting upper-arm component optical signals 626a, 628b, 628c may be muxed (604b) into an upper-arm WDM optical signal 632. The upper-arm WDM optical signal 632 is then modulated by the optical phase modulator 612 (according to the RF voltage $V_D(t)$ of the RF input signal D (316) produced by the monopulse subarray 308) and demuxed (602c) into component optical signals 626a ($V_A(t)+V_B(t)+V_D(t)$), 628b ($V_D(t)$), and 628c+($V_B(t)+V_D(t)$). The component optical signal 628c may then be fed back into the lower arm 628 (along with component optical signals 626b, 628a) and replaced in the upper arm with the component optical signal 626c ($V_A(t)$).

The component optical signals 626a, 628b, 626c may be muxed (604c) into an upper-arm WDM optical signal 634 and modulated by the optical phase modulator 614 (according to the RF voltage $V_C(t)$ of the RF input signal C (314) produced by the monopulse subarray 306) before demuxing (602d) into the component optical signals 626a ($V_A(t)+V_B(t)+V_C(t)+V_D(t)$), 628b ($V_C(t)+V_D(t)$), and 626c+($V_A(t)+V_C(t)$). Each balanced photodiode pair 616, 618, 620 receives a pair of upper-arm and lower-arm component optical signals of shared wavelength: component optical signals 626a, 628a of wavelength $\lambda_1$ are fed into the upper and lower photodiodes 616a-b of the balanced photodiode pair 616, component optical signals 628b, 626b of wavelength $\lambda_2$ are fed into the upper and lower photodiodes 618a-b of the balanced photodiode pair 618, and component optical signals 626c, 628c of wavelength $\lambda_3$ are fed into the upper and lower photodiodes 620a-b of the balanced photodiode pair 620.

The three output channels $V_{out1}(t)$, $V_{out2}(t)$, and $V_{out3}(t)$ correspond to the three RF output voltages 624a-c of the balanced photodiode pairs 616, 618, 620, each RF output voltage 624a, 624b, 624c respectively proportional to the difference of the upper and lower photodiodes 616a-b, 618a-b, 620a-b. For example, with respect to the output channel $V_{out1}(t)$, the upper-arm phase (component optical signal 626a) is proportional to $V_A+V_B+V_C+V_D$ as the component optical signal 626a is modulated by the four cascading optical phase modulators 608, 610, 612, 614. Similarly, the lower-arm phase (component optical signal 628a is unmodulated, so the RF output voltage 624a of the output channel $V_{out1}(t)$ through balanced photodiode pair 616 is proportional to $V_A+V_B+V_C+V_D$ (e.g., the sum S).

With respect to the output channel $V_{out2}(t)$, the upper-arm phase (component optical signal 628b) is proportional to $V_C+V_D$ while the lower-arm phase (component optical signal 626b) is proportional to $+V_A+V_B$. Accordingly, the RF output voltage 624b of the output channel $V_{out2}(t)$ through balanced photodiode pair 618 is proportional to [$V_C+V_D$]−[$V_A+V_B$] or [$V_A+V_B$]−[$V_C+V_D$] (e.g., the azimuthal difference $D_{AZ}$).

With respect to the output channel $V_{out3}(t)$, the upper-arm phase (component optical signal 626c) is proportional to $V_A+V_C$ while the lower-arm phase (component optical signal 628c) is proportional to $+V_B+V_D$. Accordingly, the RF output voltage 624c of the output channel $V_{out3}(t)$ through balanced photodiode pair 620 is proportional to [$V_A+V_C$]−[$V_B+V_D$] (e.g., the elevational difference $D_{EL}$). From these three RF output voltages 624a ($V_{out1}(t) \propto [V_A+V_B]+[V_C+V_D]\propto S$), 624b ($V_{out2}(t)\propto [V_A+V_B]-[V_C+V_D]\propto D_{AZ}$), and 624c ($V_{out3}(t)\propto [V_A+V_C]-[V_B+V_D]\propto D_{EL}$), the azimuthal angle (318, FIG. 3) and elevational angle (322, FIG. 3) of the inbound signal 114 can be calculated.

As will be appreciated from the above, systems and methods according to embodiments of the inventive concepts disclosed herein may provide for high speed, high resolution, high linearity and resolution, and improved amplitude/phase balance across an ultrawide bandwidth at a small chip size. As RF signal operations are implemented in the optical domain, conversion to RF and RF interference are not complicating factors.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

We claim:

1. A photonic monopulse comparator, comprising:
   an array of N squinted monopulse subarrays, each monopulse subarray comprising:
      an antenna configured to receive an inbound signal; and
      a receiver configured to produce an RF signal in response to the receiving, the RF signal associated with an RF input voltage;
   at least one photonic signal source configured to generate an optical signal;
   a plurality of optical phase modulators, each optical phase modulator communicatively coupled to a monopulse subarray of the array and to the photonic signal source, each optical phase modulator configured to modulate the optical signal based on the RF input voltage associated with the monopulse subarray;
   a plurality of optical hybrid couplers communicatively coupled to the plurality of optical phase modulators, the plurality of optical hybrid couplers configured to generate a plurality of hybrid output signals based on a plurality of modulated optical signals received from the optical phase modulators;
   an array of balanced photodiode pairs optically coupled to the plurality of optical hybrid couplers and configured to output a plurality of RF output signals based on the hybrid output signals, each RF output signal corresponding to an RF output voltage; and
   an array of analog-digital converters (ADC) coupled to the array of balanced photodiode pairs, the array of ADCs configured to convert the plurality of RF output signals into a plurality of digital output signals corresponding to at least one arrival angle of the inbound signal.

2. The photonic monopulse comparator of claim 1, wherein the plurality of optical hybrid couplers includes a 2×2 array of 90-degree optical hybrid couplers.

3. The photonic monopulse comparator of claim 2, wherein each 90-degree optical hybrid coupler is configured to generate two hybrid optical signals based on a received in-phase modulated optical signal and a received quadrature modulated optical signal.

4. The photonic monopulse comparator of claim 1, wherein the photonic signal source includes at least one of a continuous wave (CW) laser and a pulsed laser.

5. The photonic monopulse comparator of claim 1, wherein the array of N squinted monopulse subarrays includes a two-dimensional array of 4 monopulse subarrays.

6. The photonic monopulse comparator of claim 5, wherein:
   the arrival angle includes at least one of an azimuthal angle and an elevational angle; and
   the plurality of digital output signals includes at least one of:
      a first digital output signal associated with a sum of the inbound signal;
      a second digital output signal associated with an azimuthal difference of the inbound signal; and
      a third digital output signal associated with an elevational difference of the inbound signal.

7. The photonic monopulse comparator of claim 1, wherein one or more of the plurality of optical phase modulators and the plurality of optical hybrid couplers is disposed in a photonic integrated circuit (PIC).

8. The photonic monopulse comparator of claim 1, wherein the array of N squinted monopulse subarrays includes at least one of a steerable subarray, a steerable array, and a phased array.

9. The photonic monopulse comparator of claim 1, wherein the plurality of optical phase modulators includes an array of N optical phase modulators corresponding to the array of N monopulse subarrays.

10. The photonic monopulse comparator of claim 1, further comprising:
    at least one first optical splitter configured to split the optical signal into a plurality of optical component signals modulated by the plurality of optical phase modulators; and
    at least one second optical splitter configured to split the optical signal into a plurality of local oscillator signals.

11. The photonic monopulse comparator of claim 10, wherein the plurality of optical hybrid couplers includes a plurality of terminal hybrid couplers optically coupled to the array of balanced photodiode pairs, each terminal hybrid coupler comprising:
    a first input port configured to receive a hybrid output signal from the plurality of optical hybrid couplers; and
    a second input port configured to receive a local oscillator signal from the second optical splitter.

12. An integrated photonics monopulse comparator, comprising:
    an array of N squinted monopulse subarrays, each monopulse subarray comprising:
       at least one antenna element configured to receive an inbound signal; and
       a receiver configured to produce an RF signal in response to the receiving, the RF signal associated with an RF voltage;
    at least one photonic signal source configured to generate a wavelength division multiplexed (WDM) optical signal having N discrete wavelengths;

at least one optical component cascade coupled to the photonic signal source at an initial end and comprising:
   at least one wavelength multiplexer configured to combine a plurality of component optical signals into the WDM optical signal, each component optical signal associated with a discrete wavelength;
   and
   at least one wavelength demultiplexer configured to split the WDM optical signal into the plurality of component optical signals;
a plurality of N optical phase modulators corresponding to the plurality of N RF signals produced by the array of N squinted monopulse subarrays, each optical phase modulator disposed adjacent to a wavelength multiplexer of the optical component cascade and configured to modulate the WDM optical signal according to the RF voltage of the corresponding RF signal;
and
an array of balanced photodiode pairs coupled to the optical component cascade at a terminal end, each photodiode pair configured to receive from the optical component cascade a pair of modulated component optical signals of like wavelength, the array configured to generate an RF output signal having an output voltage based on the RF voltage associated with each received modulated component optical signal, the output voltage associated with an arrival angle of the inbound signal.

13. The integrated photonics monopulse comparator of claim 12, wherein the photonic signal source includes at least one of a continuous wave (CW) laser and a pulsed laser.

14. The integrated photonics monopulse comparator of claim 12, wherein the arrival angle includes at least one of an azimuthal angle and an elevational angle.

15. The integrated photonics monopulse comparator of claim 12, wherein the array of balanced photodiode pairs includes at least one of:
   a first balanced photodiode pair associated with a first output voltage and with a sum of the inbound signal;
   a second balanced photodiode pair associated with a second output voltage and with an azimuthal difference of the inbound signal;
   and
   a third balanced photodiode pair associated with a third output voltage and with an elevational difference of the inbound signal.

16. The integrated photonics monopulse comparator of claim 12, further comprising:
   at least one optical splitter configured to split the WDM optical signal into at least an upper arm and a lower arm.

17. The integrated photonics monopulse comparator of claim 16, wherein each balanced photodiode pair is configured to receive a first component optical signal corresponding to the upper arm and a second component optical signal corresponding to the lower arm.

18. The integrated photonics monopulse comparator of claim 12, wherein one or more of the optical component cascade and the plurality of N optical phase modulators is disposed in a photonic integrated circuit (PIC).

19. The integrated photonics monopulse comparator of claim 12, wherein the array of N squinted monopulse subarrays includes at least one of a steerable subarray, a steerable array, and a phased array.

* * * * *